United States Patent
Gresset et al.

(10) Patent No.: US 8,509,357 B2
(45) Date of Patent: Aug. 13, 2013

(54) METHOD AND A DEVICE FOR DETERMINING IF AN INFORMATION WORD TRANSFERRED BY AT LEAST A SOURCE HAS TO BE RELAYED

(75) Inventors: Nicolas Gresset, Rennes Cedex (FR); Melanie Plainchault, Rennes Cedex (FR); Ghaya Rekaya-Ben Othman, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 13/048,356

(22) Filed: Mar. 15, 2011

(65) Prior Publication Data
US 2011/0235754 A1    Sep. 29, 2011

(30) Foreign Application Priority Data
Mar. 24, 2010 (EP) .................. 10157454

(51) Int. Cl.
*H04L 27/06* (2006.01)
(52) U.S. Cl.
USPC .......... 375/340; 375/219; 375/295; 370/315; 370/208; 370/321; 370/347
(58) Field of Classification Search
USPC ............... 375/340, 316, 219, 295; 370/315, 370/208, 321, 347
See application file for complete search history.

(56) References Cited

U.S. PATENT DOCUMENTS
2007/0070953 A1* 3/2007 Yoon et al. ............. 370/334
2009/0325480 A1* 12/2009 Ji et al. ..................... 455/8
2010/0254300 A1* 10/2010 Gulasekaran et al. ..... 370/315

FOREIGN PATENT DOCUMENTS
WO    WO 2009/158542 A1    12/2009

OTHER PUBLICATIONS
Extended European Search Report issued Mar. 30, 2011, in European Patent Application No. 10157454.9-2411.

* cited by examiner

*Primary Examiner* — Zewdu Kassa
(74) *Attorney, Agent, or Firm* — Oblon, Spivak, McClelland, Maier & Neustadt, L.L.P.

(57) ABSTRACT

The present invention concerns a method for determining if an information word transferred by a source has to be relayed by a telecommunication device. The signals transferred by the source are composed of complex symbols obtained from the information word. The telecommunication device:
receives at least one signal composed of complex symbols transferred by at least the source,
successfully decodes the information word from the at least one received signal composed of complex symbols,
checks if the successful decoding is performed prior to an expected successful decoding time of the information word, the expected successful decoding time being obtained from prior successful decoding of other information words,
and if the successful decoding is performed prior to the expected successful decoding time of the information word:
obtains at least one signal composed of complex symbols obtained from the information word,
transfers the at least one obtained signal.

14 Claims, 6 Drawing Sheets

METHOD AND A DEVICE FOR DETERMINING IF AN INFORMATION WORD TRANSFERRED BY AT LEAST A SOURCE HAS TO BE RELAYED

The present invention relates generally to a method and a device for determining if an information word transferred by at least a source in a wireless cellular telecommunication network has to be relayed by a telecommunication device.

Future wireless cellular telecommunication networks will use higher frequency bands than the ones used by current wireless cellular telecommunication networks.

These cellular telecommunication networks, particularly in urban environment, will have dead zones, wherein the signals transferred between base stations and terminals will be highly attenuated.

The access to the wireless cellular telecommunication network might not be possible for a mobile terminal located in a dead zone, if the signals radiated by the base stations are too attenuated.

Solutions are proposed today. Particular wireless telecommunication devices, such as relays, intend to reduce dead zones.

The present invention aims at enhancing the signals received by the destination by using a relay.

To that end, the present invention concerns a method for determining if an information word transferred by a source in a wireless cellular telecommunication network has to be relayed by a telecommunication device, the signals transferred by the source being composed of complex symbols obtained from the information word, characterized in that the method comprises the steps executed by the telecommunication device of:

receiving at least one signal composed of complex symbols transferred by at least the source, successfully decoding the information word from the at least one received signal composed of complex symbols, checking if the successful decoding is performed prior to an expected successful decoding time of the information word, the expected successful decoding time being obtained from prior successful decoding of other information words, and if the successful decoding is performed prior to the expected successful decoding time of the information word:

obtaining at least one signal composed of complex symbols obtained from the information word, transferring the at least one obtained signal.

The present invention concerns also a device for determining if an information word transferred by at least a source in a wireless cellular telecommunication network has to be relayed by a telecommunication device, the signals transferred by the source being composed of complex symbols obtained from the information word, characterized in that the device for determining if the information word has to be relayed is included in the telecommunication device and comprises:

means for receiving at least one signal composed of complex symbols transferred by at least the source, means for successfully decoding the information word from the at least one received signal composed of complex symbols, means for checking if the successful decoding is performed prior to an expected successful decoding time of the information word, the expected successful decoding time being obtained from prior successful decoding of other information words, means for obtaining at least one signal composed of complex symbols obtained from the information word if the successful decoding is performed prior to the expected successful decoding time of the information word, means for transferring the at least one obtained signal if the successful decoding is performed prior to the expected successful decoding time of the information word.

Thus, the telecommunication device relays information word efficiently.

When a telecommunication device is far from the source, for example when the telecommunication device is a mobile terminal and the source is a base station, at the cell edge of the source, the signal to noise ratio of the data link between the telecommunication device and the source is low. This means that the telecommunication device has some chances not to correctly decode the message after the transmission of the whole vectors of complex modulation symbols obtained from the information word. Equivalently, the neighboring telecommunication devices of the telecommunication device will have low signal to noise ratio conditions and bad chances of correct decoding. However, the probability of early decoding is low but non-null. If that telecommunication device turns into relaying mode, its contribution is very positive for its neighboring telecommunication devices, even if it transmits signals with a low transmission power. In this situation, relaying combined with the high density of telecommunication devices is really helpful, as the probability of not having an early decoding for at least one telecommunication device is low.

When the source is far from the destination telecommunication device, for example when the source is a mobile terminal and the destination telecommunication device is a base station, the signal to noise ratio of the data link between the destination telecommunication device and the source is low. This means that the destination telecommunication device has some chances not to correctly decode the message after the transmission of the whole vectors of complex modulation symbols obtained from the information word. The other telecommunication devices like mobile terminals or relays which are also far from the source and close to the destination will have also low signal to noise ratio conditions and bad chances of correct decoding. However, the probability of early decoding is low but non-null. If another telecommunication device turns into relaying mode, its contribution is very positive for its neighboring telecommunication devices like the base station for example, even if it transmits signals with a low transmission power.

According to a particular feature, signals transferred by the source are representative of vectors of complex symbols, plural vectors of complex symbols derived from the same information word are transferred successively and the check if the successful decoding is performed prior to an expected successful decoding time of the information word is executed by comparing if the vector of complex symbols from which the information word is successfully decoded is transferred prior to the vector of complex symbols from which the information word is the expected to be decoded.

Thus, one can determine if the successful decoding happens earlier than usual, for example because the transmission link quality is better than usual.

According to a particular feature, the expected successful decoding time is determined from statistics executed on prior successful decoding of other information words.

Thus, one learns through time the expected successful decoding time.

According to a particular feature, statistics are performed taking into account if signals are relayed by at least another telecommunication device.

Thus, it is possible to take into account the relays activation in the optimization of the system.

According to a particular feature, each transferred vector of complex symbols derived from the same information word has an index and statistics are performed for each index.

Thus, it is possible to optimize the system dynamically according to the vector of complex symbols index.

According to a particular feature, the transmission power of at least one obtained signal transferred by the telecommunication device is dependent on the index of the vector of complex symbols from which information word is successfully decoded.

Thus, the telecommunication device can adjust the power budget dedicated to signal transfer, and give more strength to selected retransmission indexes.

According to a particular feature, statistics are performed for each vector of complex symbols on the amount of coded bits received from the beginning of the reception transmission of the information word and after the reception of each vector of complex symbols.

Thus, if the number of complex symbols per vector of complex symbols changes from one transmission to another, the invention can still be applied.

According to a particular feature, statistics are performed on an equivalent coding rate after the reception of one vector of complex symbols, the equivalent coding rate being defined as the ratio between the number of transferred information bits of the information word in the received vector of complex symbols and the total amount of bits received from the beginning of the transmission of the information word.

Thus, if the number of transmitted information bits changes from one transmission to another, the invention can still be applied.

According to a particular feature, the prior successful decoding of other information words is executed by the telecommunication device.

Thus, no exchange is needed in the wireless telecommunication network so that the telecommunication device knows its own expected successful decoding time.

According to a particular feature, the prior successful decoding of other information words is executed by other telecommunication devices and the telecommunication device detects the successful decoding of other information words by other telecommunication devices by monitoring acknowledgment and/or non acknowledgment messages transferred by the other telecommunication devices.

Thus, a telecommunication device knows the expected successful decoding time of its neighbors.

According to a particular feature, the at least one signal composed of complex symbols transferred by at least the source is transferred to plural telecommunication devices.

Thus, each telecommunication device can, as soon as it has correctly decoded the message, decide to transfer additional signal corresponding to the same message to other telecommunication devices.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 3:
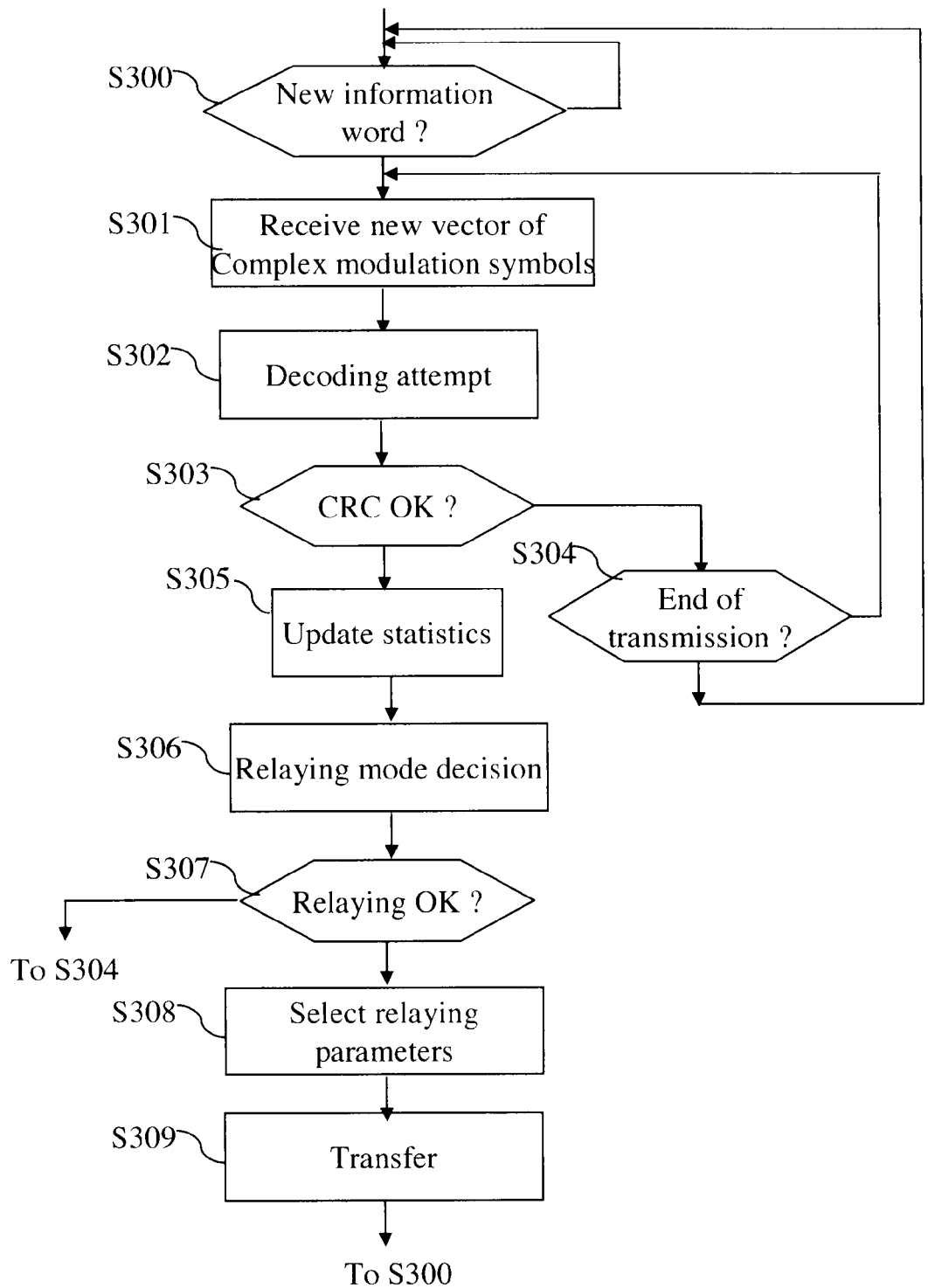
Figure 5:
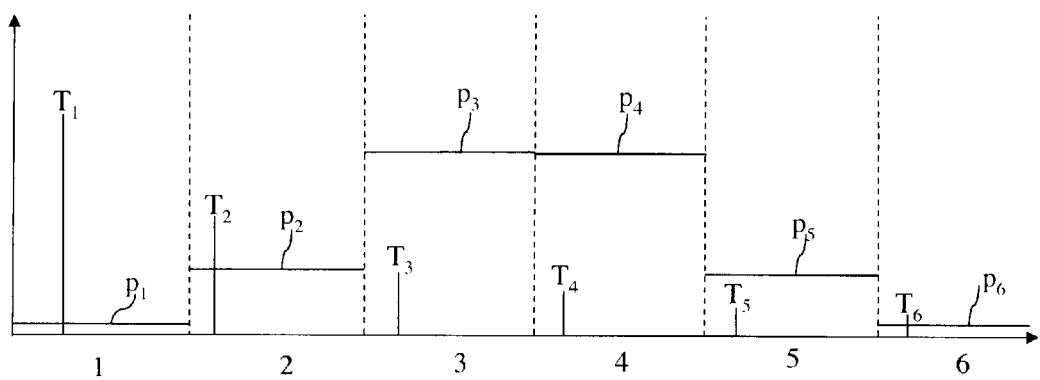
Figure 6:
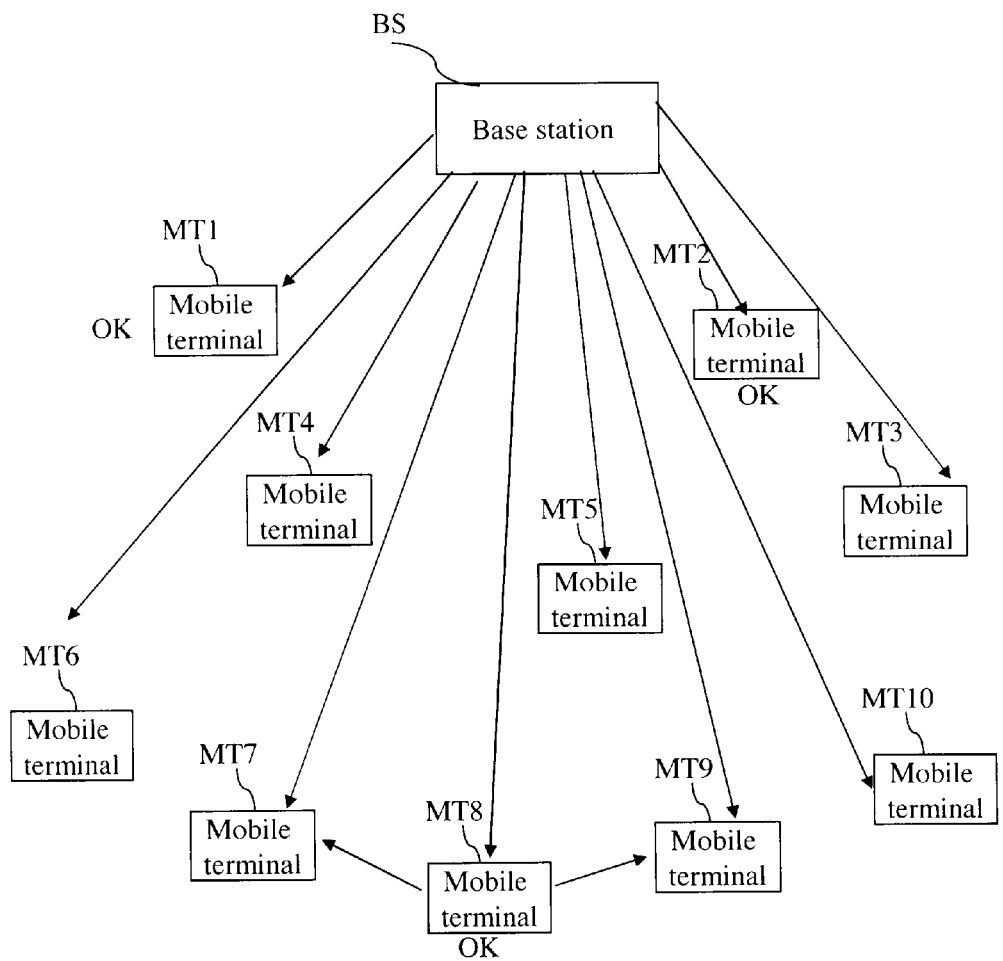

FIG. 3 discloses an example of an algorithm executed by the telecommunication device according to the present invention;

FIGS. 4a to 4d disclose examples of statistics made by telecommunication devices on the successful decoding of an information word after the decoding of vectors of complex modulation symbols transmitted at least by a base station according to the present invention;

FIG. 5 discloses an example of parameter values derived from statistics made by a telecommunication device on the successful decoding of an information word after the decoding of vectors of complex modulation symbols transmitted at least by a source according to the present invention;

FIG. 6 represents an example of the transfer of signals in the wireless cellular telecommunication network according to the present invention.

Figure 1:
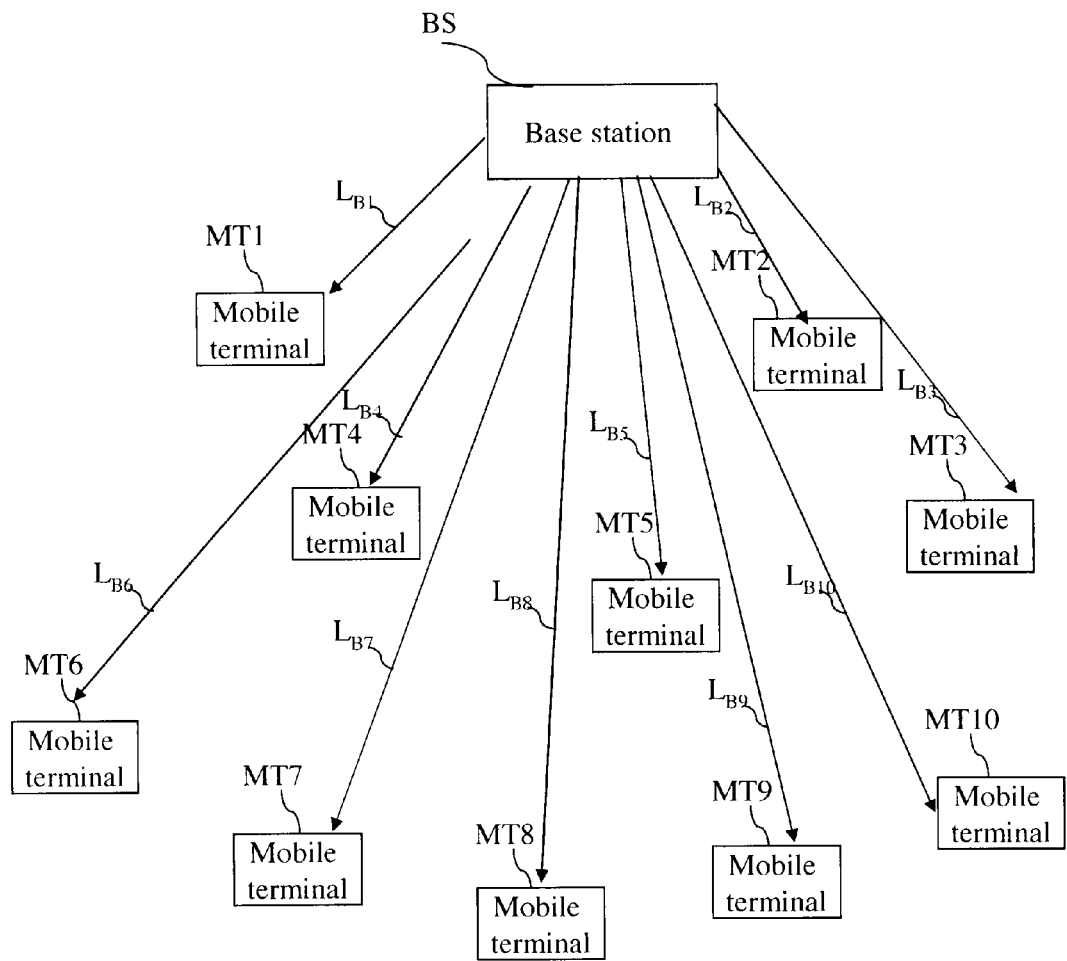
FIG. 1 represents an example of a topology of a wireless cellular telecommunication network and of the transfer of signals in the wireless cellular telecommunication network.

FIG. 1 represents an example of a topology of a wireless cellular telecommunication network and of the transfer of signals in the wireless cellular telecommunication network.

In the example of FIG. 1 a source, like a base station BS, transfers signals to at least two telecommunication devices like mobile terminals MT.

According to the example of the FIG. 1, the base station BS transfers signals to ten telecommunication devices MT1 to MT10.

The base station is also named an access node or a node B or an enhanced node B or a home base station or a pico or femto base station.

The base station BS may be in a variant a broadcasting device like, for example, a satellite.

The telecommunication devices MT are for example, mobile terminals or relays or femto base stations.

The telecommunication devices MT1 to MT10 operate, when they are in a relaying mode, according to a Dynamic Decode and Forward (DDF) protocol.

DDF protocol includes a smart processing at the telecommunication device MT which is in relay mode. The telecommunication device MT receives and tries to decode the information transmitted from the base station BS and may shift to a relaying mode after that the decoding leads to no error.

In a particular mode of realization, when a telecommunication device MT is in relaying mode, the telecommunication device MT transfers signals on the same frequency/time resource as the base station BS.

Ten telecommunication devices MT1 to MT10 are shown but we can understand that the present invention works when a different, e.g., more important, number of telecommunication devices MT exist in the wireless cellular telecommunication network.

The base station BS transmits K information bits of an information word with redundancy which are encoded by an encoder, output of which is interleaved to produce a vector of coded bits.

The vector of coded bits is given to the discrete modulation input which may be a Quadrature Phase Shift Keying modulation or a 16, 32 or 64 Quadrature Amplitude Modulation in order to obtain complex modulation symbols. The complex modulation symbols are grouped into vectors of complex modulation symbols which encompass several blocks of complex modulation symbols.

Encoding and interleaving is done more generally by a rate matching algorithm, such as the one used in the 3GPP-LTE standard (Third Generation Partnership Project-Long Term Evolution), that allows to generate any size of vector of coded bits from the information words, or in other words any possible coding rate.

The present invention is applicable in open-loop transmissions like broadcasting where a codeword is segmented into several vectors of coded bits or equivalently to several vectors of complex modulation symbols.

The present invention is also applicable in a wireless cellular telecommunication network wherein a Hybrid-ARQ (HARQ) feedback scheme is provided from the destination (the telecommunication device or devices) to the base station BS in order to acknowledge or not the success of former blocks transmissions.

In Hybrid-ARQ, a retransmission of additional redundancy is executed when the destination is not able to successfully decode symbols, i.e. when the cyclic redundancy check embedded in the sent information word (CRC) fails.

As soon as sufficient redundancy is received, the telecommunication device MT can decode the message correctly and the transmission is stopped.

The telecommunication device MT stores the concatenation of vectors of complex modulation symbols or of soft estimates of the coded bits received from the beginning of one information word transmission and applies a joint decoding on the concatenated vectors.

An acknowledgment is performed after a vector of complex modulation symbols reception and decoding if the CRC check for the vector of complex modulation symbols is correct.

Usually, each new vector of complex modulation symbols comprises additional redundancy taken from the output of the rate matching algorithm and of the error correcting code.

The arrows noted $L_{B1}$ to $L_{B10}$ represent the wireless link between the base station BS and the respective telecommunication devices MT1 to MT10.

According to the invention, when a telecommunication device receives and successfully decodes symbols, the telecommunication device MT decides to switch in a relaying mode according to a given criteria. The given criteria is, for example, the successful decoding time of an information word in comparison with successful decoding times of previously received information word or words.

When the telecommunication device MT is in relaying mode, the telecommunication device MT transfers at least one vector of complex symbols derived from the same information word of which the vector or vectors of complex symbols transferred by the base station BS are derived from. Each new vector of complex modulation symbols transferred by the telecommunication device MT comprises additional redundancy taken from the output of the same rate matching algorithm and of the same error correcting code as the one used by the base station BS.

The vector or vectors of complex symbols are, for example, transferred at the same time as the base station BS also transfers other vector or vectors of complex symbols that have not previously been transferred by the base station BS.

In a particular mode of realization of the present invention, the telecommunication device MT monitors the acknowledgments and non acknowledgments transferred by the neighboring telecommunication devices MT in order to determine the successful decoding time of previously received information word or words by neighboring terminals.

The telecommunication devices MT and the base station BS may have plural antennas not shown in FIG. 1.

It has to be noted here that the source may be also a mobile terminal which transfers signals to at least a base station and wherein the present invention is executed by at least one telecommunication like a relay.

The relay decides or not if it relays signals in order to save its electric power source of energy in order to efficiently manage the wireless resources allocated to it.

Figure 2:
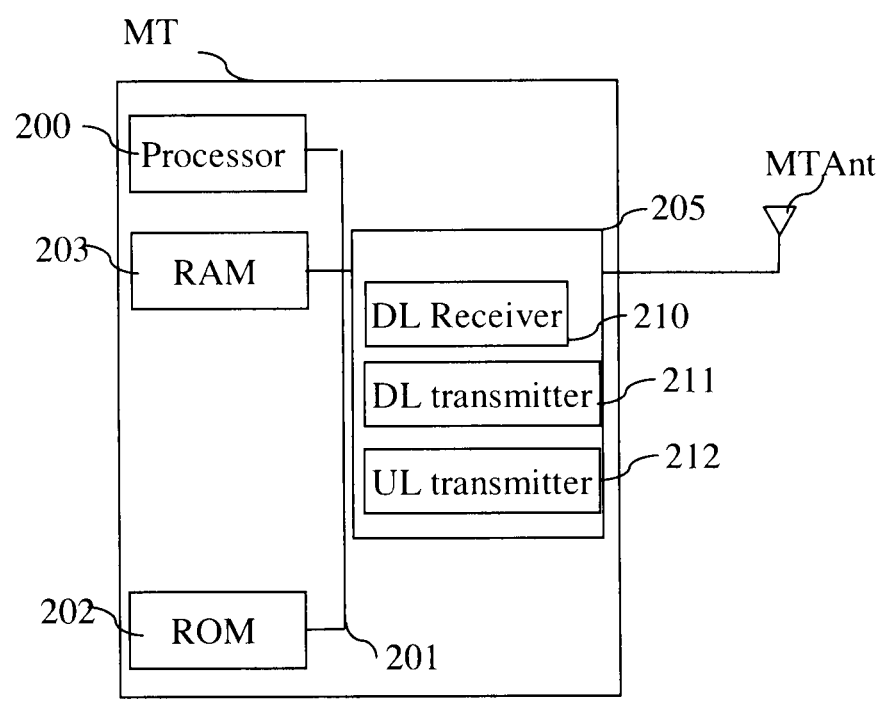
FIG. 2 is a diagram representing the architecture of a telecommunication device in which the present invention is implemented.

FIG. 2 is a diagram representing the architecture of a telecommunication device in which the present invention is implemented.

The telecommunication device is for example a mobile terminal MT.

The telecommunication device MT has, for example, an architecture based on components connected together by a bus 201 and a processor 200 controlled by the program as disclosed in the FIG. 3.

The bus 201 links the processor 200 to a read only memory ROM 202, a random access memory RAM 203 and a wireless interface 205.

The memory 203 contains registers intended to receive variables and the instructions of the program as disclosed in the FIG. 3.

The processor 200 controls the operation of the wireless interface 205.

The read only memory 202 contains instructions of the program as disclosed in the FIG. 3, which are transferred, when the telecommunication device MT is powered on, to the random access memory 203.

The wireless interface 205 enables the telecommunication device MT to transfer and/or receive signals or messages to/from a base station BS.

The wireless interface 205 comprises a downlink reception module 210 which receives signals transferred by at least one base station BS, comprises a downlink transmission module 211 which transfers signals to at least one telecommunication device and comprises an uplink transmission module 212 which transfers signals to at least one base station BS.

If the telecommunication device MT is a relay, the telecommunication device may further comprise an uplink receiver which receives signals transferred by mobile terminals to the base station BS.

FIG. 3 discloses an example of an algorithm executed by the telecommunication device according to the present invention.

The present algorithm will be disclosed in an example wherein the telecommunication device MT is a mobile terminal MT.

The present algorithm may be also executed by relays.

More precisely, the present algorithm is executed by the processor 200 of each telecommunication device MT.

At step S300, the processor 200 checks if signals representative of the transmission of a new information word start.

As far as signals representative of a new information word are not received, the processor 200 waits at step S300.

If signals representative of a new information word are received, the processor 200 moves to step S301.

At step S301, the processor 200 detects the reception of at least one signal composed of complex modulation symbols obtained from information bits of the new information word and received through the wireless interface 205.

The at least one signal of complex modulation symbols obtained from information bits is received by the downlink receiver 210 and is concatenated, if there are some, to the complex modulation symbols which have been previously received from the beginning of the transmission of the information word.

At next step S302, the processor 200 commands the wireless interface 205 to execute a decoding attempt on at least the received signal composed of complex modulation symbols obtained from information bits and may include other complex modulation symbols previously received by the telecommunication device MT.

The complex modulation symbols are demodulated into soft-estimates of coded bits, de-interleaved and decoded into the information bits estimates.

At next step S303, the processor 200 checks if the cyclic redundancy check (CRC) determined after the decoding of the at least one received signal composed of complex modulation symbols is correct.

If the CRC is correct, it means that the decoding is successful and the processor 200 moves to step S305. Otherwise, the processor 200 moves to step S304.

At step S304, the processor 200 checks if the transmission of complex modulation symbols ends for the information word from which previous signal composed of complex modulation symbols obtained from information word have been received.

If the transmission of complex modulation symbols ends for the information word, the processor 200 returns to step S300. Otherwise, the processor 200 moves to step S301.

At step S305, the processor 200 updates statistics related to the successful decoding time of signals composed of complex modulation symbols obtained from information words.

Example of statics are given in reference to the FIGS. 4a to 4d.

In FIGS. 4a to 4d, different histograms are resulting from different link qualities between the base station BS and the telecommunication devices MT.

After several receptions of vectors of complex modulation symbols, each telecommunication device MT can compute the probability of successful decoding of an information word after the decoding of a given vector of complex modulation symbols. The histograms for each telecommunication device MT are shown and exhibit lower average value (i.e., earlier successful decoding) when the link quality between the base station BS and the telecommunication device is better.

The histograms, or discrete probability densities, are evaluated through several transmissions and updated. A forgetting factor may be used in the update rule for taking into account the mobility of the telecommunication device MT. Indeed, the histogram of a moving telecommunication device MT changes through time as the link quality between the telecommunication device and the base station BS changes.

Figure 4A:
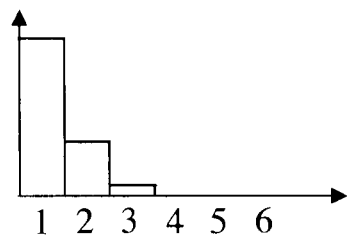

FIG. 4a discloses an example of statistics made by the telecommunication device MT1 on the successful decoding of an information word after the decoding of vectors of complex modulation symbols transmitted at least by a base station according to the present invention.

The horizontal axis shows index of the different vectors of complex modulation symbols obtained from a same information word.

The vertical axis shows information representative of the probability of successful decoding of information words after the reception of vectors of complex modulation symbols sharing the same index.

As the telecommunication device MT1 is close to the base station BS, as shown in FIG. 1, an information word can be successfully decoded, i.e. a CRC check is correct, generally from the decoding of the first transferred vector of complex modulation symbols obtained from an information word.

It is rarely needed, for the first telecommunication device MT1 to decode the second or the third transferred vector of complex modulation symbols obtained from an information word as the successful decoding often occurs after the first transferred vector of complex modulation symbols.

It is almost never needed, for the first telecommunication device MT1 to decode the fourth, fifth and sixth transferred vectors of complex modulation symbols obtained from an information word as the successful decoding already occurs after the first or second or third transferred vectors of complex modulation symbols.

Figure 4B:
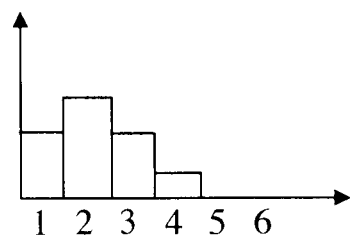

FIG. 4b discloses an example of statistics made by the telecommunication device MT4 on the successful decoding of an information word after the decoding of vectors of complex modulation symbols transmitted at least by a base station according to the present invention.

The horizontal axis shows indexes of the different vectors of complex modulation symbols obtained from a same information word.

An index is representative of an order of transmission of a vector of complex modulation symbols obtained from a same information word.

The vertical axis shows information representative of the probability of successful decoding of information words after the reception of vectors of complex modulation symbols sharing the same index or in other words, the probability that a vector of complex modulation symbols having a given index is successfully decoded.

As the telecommunication device MT4 is more distant than the telecommunication device MT1 from the base station BS, as shown in FIG. 1, it takes more redundancy to successfully decode an information word, i.e. more vectors of complex modulation symbols need to be obtained from a same information word.

The second vector of complex modulation symbols obtained from a same information word has the first highest probability of successful decoding of the information word by the telecommunication device MT4.

The first and third vectors of complex modulation symbols obtained from a same information word have the second highest probability of successful decoding of the information word by the telecommunication device MT4.

The fourth vector of complex modulation symbols obtained from a same information word has a lower probability than the three first vectors of successful decoding of the information word by the telecommunication device MT4.

The probability to successfully decode the information word after the decoding of the first vector of complex modulation symbols has a low probability because the quantity of redundancy is often not sufficient with respect to the link quality.

The probability to successfully decode the information word after the decoding of the third vector of complex modulation symbols has a low probability because the message is usually successfully decoded after the reception of the second vector of complex modulation symbols.

It is almost never needed, for the first telecommunication device MT4 to decode the fifth and sixth transferred vectors of complex modulation symbols obtained from an information word as the successful decoding already occurs after the first or second or third or fourth transferred vectors of complex modulation symbols.

Figure 4C:
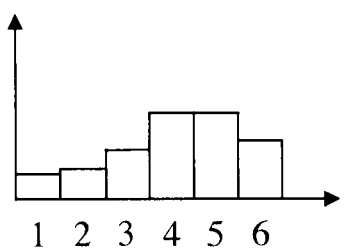

FIG. 4c discloses an example of statistics made by the telecommunication device MT5 on the successful decoding of an information word after the decoding of vectors of complex modulation symbols transmitted at least by a base station according to the present invention.

The horizontal axis shows index of the different vectors of complex modulation symbols obtained from a same information word.

The vertical axis shows information representative of the probability of successful decoding of information words after the reception of vectors of complex modulation symbols sharing the same index or in other words, the probability that a vector of complex modulation symbols having a given index is successfully decoded.

As the telecommunication device MT5 is more distant than the telecommunication device MT4 from the base station BS, as shown in FIG. 1, it takes more redundancy to successfully decode an information word, i.e. more vectors of complex modulation symbols need to be obtained from a same information word.

The fourth and fifth vectors of complex modulation symbols obtained from a same information word have the first higher probability of successful decoding of the information word by the telecommunication device MT5.

The sixth vector of complex modulation symbols obtained from a same information word has the second higher probability of successful decoding of the information word by the telecommunication device MT5.

The third vector of complex modulation symbols obtained from a same information word has the third higher probability of successful decoding of the information by the telecommunication device MT5.

The second vector of complex modulation symbols obtained from a same information word has the fourth higher probability of successful decoding of the information word by the telecommunication device MT5.

The first vector of complex modulation symbols obtained from a same information word has the lower probability of successful decoding of the information word after the decoding by the telecommunication device MT.

The probability to successfully decode the information word after the decoding of the first, second and third vectors of complex modulation symbols has a low probability because the quantity of redundancy is often not sufficient with respect to the link quality.

The probability to successfully decode the information word after the decoding of the sixth vector of complex modulation symbols has a low probability because the message is usually successfully decoded after the reception of the fourth or fifth vector of complex modulation symbols.

Figure 4D:
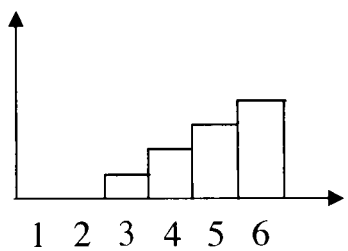

FIG. 4d discloses an example of statistics made by the telecommunication device MT8 on the successful decoding of an information word after the decoding of vectors of complex modulation symbols transmitted at least by a base station according to the present invention.

The horizontal axis shows index of the different vectors of complex modulation symbols obtained from a same information word.

The vertical axis shows information representative of the probability of successful decoding of information words after the reception of vectors of complex modulation symbols sharing the same index or in other words, the probability that a vector of complex modulation symbols having a given index is successfully decoded.

As the telecommunication device MT8 is more distant than the telecommunication device MT5 from the base station BS, as shown in FIG. 1, it takes more redundancy to successfully decode an information word, i.e. more vectors of complex modulation symbols need to be obtained from a same information word.

The sixth vector of complex modulation symbols obtained from a same information word has the first higher probability of successful decoding of the information word by the telecommunication device MT8.

The fifth vector of complex modulation symbols obtained from a same information word has the second higher probability of successful decoding of the information word by the telecommunication device MT8.

The fourth vector of complex modulation symbols obtained from a same information word has the third higher probability of successful decoding of the information word by the telecommunication device MT8.

The third vector of complex modulation symbols obtained from a same information word has the fourth higher probability of successful decoding of the information word by the telecommunication device MT8.

The first and second vectors of complex modulation symbols obtained from a same information word have the lower probability of successful decoding of the information word by the telecommunication device MT8.

In the example of FIG. 4d, the probability that the first and second vectors of complex modulation symbols obtained from a same information word are successfully decoded is almost equal to null value.

The probability to successfully decode the information word after the decoding of the third, fourth, fifth and sixth vectors of complex modulation symbols increase progressively because the quantity of redundancy increases progressively.

The probability to successfully decode the information word after the decoding of the first and second vectors of complex modulation symbols has a low probability because the quantity of redundancy is often not sufficient with respect to the link quality.

It has to be noted here that statistics shown in FIGS. 4a to 4d may also be further updated by a given telecommunication device MT according to acknowledgment and/or non acknowledgment messages transferred by neighboring telecommunication devices of said terminal.

It has to be noted here that the above mentioned statistics are done when each information word is transferred into the same number of vectors of complex modulation symbols and when each i-th vector of complex modulation symbols has the same number of complex symbols from one transmission to another. In other word, the information payload, the coding, and the segmentation into complex vectors do not change from one transmission to another.

It has to be noted here that statistics shown in FIGS. 4a to 4d may also be further updated by taking into account the detection of telecommunication devices MT which are in relaying mode, for example by monitoring sudden increase of the power reception of signals. For example, the probability density is updated only if no neighboring telecommunication device is in relaying mode during the transmission of the information word.

It has to be noted here that in a variant the statistics shown in FIGS. 4a to 4d may, instead of being executed on index of vectors, be executed on the amount of coded bits received from the beginning of the transmission of the information word and after the reception of each vector of complex symbols. This allows for applying the present invention to cases where the number of information bits in one information message does not change through time, but where the segmentation of the information word into vectors of complex symbols might vary from one transmission to another.

It has to be noted here that in a variant the statistics shown in FIGS. 4a to 4d may, instead of being executed on index of vectors, be executed on the equivalent coding rate after the reception of one vector of complex symbols. The equivalent coding rate is defined after each reception of a vector of complex symbols as the ratio between the number of transferred information bits in the received vector of complex symbols and the total amount of coded bits received from the beginning of the transmission of the information word. This allows for applying the present invention to cases where the number of information bits in one information message and the segmentation of the coded word into vector of complex symbols might vary from one message transmission to another.

At next step S306, the processor 200 decides whether or not the telecommunication device MT switches to a relaying mode.

The processor 200 decides to switch in a relaying mode according to a given criteria. The given criteria is for example, the decoding time of an information word in comparison with previously received information word or words.

More particularly, the processor 200 decides to switch in a relaying mode when a vector of complex modulation symbols obtained from an information word has an index for which the probability of decoding is low and which is lower than the index of the vector of complex modulation symbols having the higher probability of successful decoding.

When a telecommunication device MT, like the telecommunication device MT1, is very close to the base station BS, the signal to noise ratio (SNR) of the data link between the telecommunication device MT1 and the base station BS is high. This means that the telecommunication device MT1 has good chances to be able to correctly decode the information word after the transmission of the first vector of complex modulation symbols obtained from said information word. Equivalently, the neighboring telecommunication devices MT of the telecommunication device MT1 have good SNR conditions and good chances to early decode the information word as well. In this situation, relaying is not helpful for neighboring telecommunication devices MT.

The telecommunication devices MT needing link quality improvement lie far from the base station BS and the telecommunication device MT1. Thus, the signal transferred by the telecommunication device MT1 which acts in relaying mode must have a high transmit power in order to be received efficiently by the telecommunication devices MT which are far from the telecommunication device MT1. In such case, turning the telecommunication device MT1 into relaying mode after correct decoding might be a waste of energy for the telecommunication device MT1.

When a telecommunication device MT, like the telecommunication device MT8, is at the cell edge of the base station BS, the signal to noise ratio (SNR) of the data link between the telecommunication device MT8 and the base station BS is low. This means that the telecommunication device MT8 has some chances not to correctly decode the message after the transmission of the whole vectors of complex modulation symbols obtained from the information word. Equivalently, the neighboring telecommunication devices of the telecommunication device MT8 will have low SNR conditions and bad chances of correct decoding.

However, the probability of early decoding is low but non-null. If the telecommunication device MT8 turns into relaying mode, its contribution is very positive for its neighboring telecommunication devices, even if it transmits signals with a low transmission power. In this situation, relaying combined with the high density of telecommunication devices is really helpful, as the probability of not having an early decoding for at least one telecommunication device MT is low.

Furthermore, as the telecommunication device's switch into relaying mode is mainly a function of the fast fading channel, relaying mode appears as random on a long-term observation, which means that a telecommunication device MT more often takes benefit from other neighboring telecommunication devices in relaying mode than it actually turns into the relaying mode and consume power.

For example, if the index of a vector of complex modulation symbols which is successfully decoded is lower than the average index of vector of complex modulation symbols, the processor 200 decides to switch in a relaying mode.

At next step S307, the processor 200 checks if it has been decided that the telecommunication device MT switches into relaying mode.

If it has been decided that the telecommunication device MT switches into relaying mode, the processor 200 moves to step S308. Otherwise, the processor 200 moves to step S304.

At step S308, the processor 200 selects the parameters used for relaying signals.

The telecommunication device MT transfers at least one vector of complex symbols derived from the same information word of which the vector or vectors of complex symbols transferred by the base station BS are derived.

According to a particular feature, the transmit power is one parameter used for relaying signals. For example, the transmit power is adjusted according to the probability of successful decoding or to the index of successful decoding which corresponds to the vector of complex symbols which has been successfully decoded.

As an early decoding is very profitable to neighboring telecommunication devices MT, the coverage area of the telecommunication device MT which switches in relaying mode is increased by a boosted transmit power, which is profitable to more telecommunication devices than with an average transmit power. In cases where the profitableness brought by a telecommunication device MT which switches in relaying mode is low, the telecommunication device MT relaying transmit power is set to low or null.

FIG. 5 discloses an example of parameter values derived from statistics made by a telecommunication device on the successful decoding of an information word after the decoding of vectors of complex modulation symbols transmitted at least by a base station according to the present invention.

In FIG. 5, a maximum number of six vectors of complex symbols which are derived from a same information word are transferred.

To the first transmitted vector of complex symbols, a probability of successful decoding $p_1$ and a transmit power $T_1$ are shown.

To the second transmitted vector of complex symbols, a probability of successful decoding $p_2 > p_1$ and a transmit power $T_2 < T_1$ are shown.

To the third transmitted vector of complex symbols, a probability of successful decoding $p_3 > p_2$ and a transmit power $T_3 < T_2$ are shown.

To the fourth transmitted vector of complex symbols, a probability of successful decoding $p_4 = p_3$ and a transmit power $T_4 < T_3$ are shown.

To the fifth transmitted vector of complex symbols, a probability of successful decoding $p_5 < p_4$ and a transmit power $T_5 < T_4$ are shown.

To the sixth transmitted vector of complex symbols, a probability of successful decoding $p_6<p_5$ and a transmit power $T_6<T_1$ are shown.

The average transmit power T when the telecommunication device MT is in relaying mode is equal to:

$$T = \sum_{i=1}^{B} p_i T_i$$

where B is the maximum number vectors of complex symbols which are derived from a same information word.

The $T_i$ values are preferably chosen as decreasing and might be obtained by optimization tools and by using some propagation models between telecommunication devices.

According to another particular feature, a parameter probability $a_i$ is further introduced. When the telecommunication device MT has correctly decoded the information word, after having applied the above mentioned criteria, the processor 200 picks up at random whether it should switch in relaying mode or not according to the parameter probability $a_i$. This allows for adjusting the average transmit power for one telecommunication device which is in relaying mode as follows:

$$T = \sum_{i=1}^{B} a_i p_i T_i$$

According to a particular feature, which is combined or not with aforementioned features, the processor 200 determines also the duration of the relaying mode as a function of the successful decoding time of the information word. For example, a telecommunication device MT which performs a successful decoding of the information word after the decoding of the first vector of complex symbols may decide to transmit with a high power only during the second vector of complex symbols transmission and not for the remaining vector of complex symbols.

At next step S309, the processor 200 commands the transfer of the relayed information word. The vectors of complex symbols are, for example, transferred at the same time as the base station BS also transfers other vectors of complex symbols that have not previously been transferred by the base station BS. The telecommunication device transfers at most the number of vectors of complex symbols which is equal to the total number of complex vectors of complex symbols that are derived from one information word minus the index of the received vector of complex symbols after which the successful decoding is performed.

After that, the processor 200 returns to step S300 already described.

FIG. 6 represents an example of the transfer of signals in the wireless cellular telecommunication network according to the present invention.

In the example of FIG. 6, the telecommunication devices MT1, MT2 and MT8 successfully decode the information word after the decoding of the first vector of complex symbols derived from an information word.

As the telecommunication devices MT1 and MT2 are very close to the base station BS, the telecommunication devices MT1 and MT2 decide not to switch in relaying mode.

On the contrary as the telecommunication device MT8 is at the border of the cell of the base station BS, the probability that the telecommunication device MT8 successfully decodes the first vectors of complex symbols derived from an information word is very low as shown in FIG. 4d. The telecommunication device MT8 decides to switch in relaying mode.

Naturally, many modifications can be made to the embodiments of the invention described above without departing from the scope of the present invention.

The invention claimed is:

1. A method for determining if an information word transferred by a source in a wireless cellular telecommunication network has to be relayed by a telecommunication device, signals transferred by the source being composed of complex symbols obtained from the information word, the method executed by the telecommunication device, comprising the steps of:
   receiving at least one signal composed of complex symbols transferred by at least the source;
   successfully decoding the information word from the at least one received signal composed of complex symbols;
   checking if the successful decoding of the information word is completed prior to an expected successful decoding time of the information word, the expected successful decoding time being obtained from prior successful decoding of other information words;
   and if the successful decoding of the information word is completed prior to the expected successful decoding time of the information word:
      obtaining at least one signal composed of complex symbols obtained from the information word, and
      transferring the at least one obtained signal.

2. The method according to claim 1, wherein signals transferred by the source are representative of vectors of complex symbols, plural vectors of complex symbols derived from the same information word are transferred successively and in that the check if the successful decoding of the information word is completed prior to an expected successful decoding time of the information word is executed by comparing if the vector of complex symbols from which the information word is successfully decoded is transferred prior to the vector of complex symbols from which the information word is expected to be decoded.

3. The method according to claim 2, wherein the expected successful decoding time is determined from statistics executed on prior successful decoding of other information words.

4. The method according to claim 3, wherein statistics are performed taking into account if signals are relayed by at least another telecommunication device.

5. The method according to claim 3, wherein each transferred vector of complex symbols derived from the same information word has an index and in that statistics are performed for each index.

6. The method according to claim 5, wherein the transmission power of at least one obtained signal transferred by the telecommunication device is dependent on the index of the vector of complex symbols from which information word is successfully decoded.

7. The method according to claim 3, wherein statistics are performed for each vector of complex symbols on the amount of coded bits received from the beginning of the reception transmission of the information word and after the reception of each vector of complex symbols.

8. The method according to claim 3, wherein statistics are performed on an equivalent coding rate after the reception of one vector of complex symbols, the equivalent coding rate being defined as the ratio between the number of transferred information bits of the information word in the received vector of complex symbols and the total amount of bits received from the beginning of the transmission of the information word.

9. The method according to claim 3, wherein the successful decoding of other information words is executed by the telecommunication device.

10. The method according to claim 3, wherein the successful decoding of other information words is executed by other telecommunication devices and in that the telecommunication device detects the successful decoding of other information words by other telecommunication devices by monitoring acknowledgment and/or non acknowledgment messages transferred by the other telecommunication devices.

11. The method according to claim 1, wherein the at least one signal composed of complex symbols transferred by at least the source is transferred to plural telecommunication devices.

12. A decoding device for determining if an information word transferred by at least a source in a wireless cellular telecommunication network has to be relayed by a telecommunication device, signals transferred by the source being composed of complex symbols obtained from the information word, the decoding device for determining if the information word has to be relayed included in the telecommunication device, the decoding device comprising:

means for receiving at least one signal composed of complex symbols transferred by at least the source;

means for successfully decoding the information word from the at least one received signal composed of complex symbols;

means for checking if the successful decoding of the information word is completed prior to an expected successful decoding time of the information word, the expected successful decoding time being obtained from prior successful decoding of other information words;

means for obtaining at least one signal composed of complex symbols obtained from the information word if the successful decoding is performed prior to the expected successful decoding time of the information word; and means for transferring the at least one obtained signal if the successful decoding of the information word is completed prior to the expected successful decoding time of the information word.

13. A base station of a wireless cellular telecommunication network comprising the decoding device of claim 12 for determining if the information word has to be relayed.

14. A mobile terminal of a wireless cellular telecommunication network comprising the decoding device of claim 12 for determining if the information word has to be relayed.

* * * * *